US010942922B2

(12) United States Patent
Cummings et al.

(10) Patent No.: US 10,942,922 B2
(45) Date of Patent: Mar. 9, 2021

(54) GENERATION OF DATA FLOW FROM SYNTAX TREE

(71) Applicant: Microsoft Technology Licensing, LLC, Redmond, WA (US)

(72) Inventors: David Joseph Cummings, Kirkland, WA (US); Zhaoji Chen, Issaquah, WA (US); Yifung Lin, Beijing (CN); Dian Zhang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1166 days.

(21) Appl. No.: 15/195,593

(22) Filed: Jun. 28, 2016

(65) Prior Publication Data

US 2017/0091293 A1    Mar. 30, 2017

Related U.S. Application Data

(60) Provisional application No. 62/233,967, filed on Sep. 28, 2015.

(51) Int. Cl.
*G06F 16/242*     (2019.01)
*G06F 40/211*     (2020.01)
(Continued)

(52) U.S. Cl.
CPC ...... *G06F 16/2423* (2019.01); *G06F 16/2246* (2019.01); *G06F 16/248* (2019.01);
(Continued)

(58) Field of Classification Search
CPC .. G06F 16/26; G06F 16/2246; G06F 16/2423; G06F 16/2428; G06F 40/284; G06F 40/211
See application file for complete search history.

(56) References Cited

U.S. PATENT DOCUMENTS 5,259,766 A    11/1993    Sack et al.
6,052,518 A     4/2000    Shigeta et al.
(Continued)

FOREIGN PATENT DOCUMENTS

CN    102339295 A    2/2012

OTHER PUBLICATIONS

Papastefanatos, et al., "Hecataeus: A Framework for Representing SQL Constructs as Graphs", In Proceedings of 10th International Workshop on Exploring Modeling Methods for Systems Analysis and Design, Jun. 13, 2005, 8 pages.

(Continued)

*Primary Examiner* — Marc S Somers
(74) *Attorney, Agent, or Firm* — Workman Nydegger

(57) ABSTRACT

A computerized mechanism to formulate a data flow representation from a syntax tree. The syntax tree may be, for instance, an abstract syntax tree (AST) that is formulated by compiling query script, such as big data query script. Each node in the syntax tree is composed of one or more tokens (script portions) that are taken from the query script, which relationships between the tokens being syntactically represented by links between those tokens. Accordingly, the data flow representation may also be a data flow representation of the original query script itself. In order to formulate the data flow representation from the syntax tree, the data types of the various inputs and outputs of the syntax tree nodes are identified and bound to a corresponding data flow. This may be performed whilst honoring dependencies between the nodes. The data flow may be visualized to an author or reviewer of the script.

20 Claims, 15 Drawing Sheets

(51) Int. Cl.
  *G06F 40/284* (2020.01)
  *G06F 16/26* (2019.01)
  *G06F 16/248* (2019.01)
  *G06F 16/31* (2019.01)
  *G06F 16/22* (2019.01)
  *G06F 16/2455* (2019.01)
  *G06F 16/33* (2019.01)

(52) U.S. Cl.
  CPC ...... *G06F 16/2433* (2019.01); *G06F 16/2455* (2019.01); *G06F 16/26* (2019.01); *G06F 16/322* (2019.01); *G06F 16/3344* (2019.01); *G06F 40/211* (2020.01); *G06F 40/284* (2020.01)

(56) References Cited

U.S. PATENT DOCUMENTS

| | | |
|---|---|---|
| 6,594,783 B1 | 7/2003 | Dollin et al. |
| 6,785,668 B1 | 8/2004 | Polo et al. |
| 7,047,232 B1 | 5/2006 | Serrano |
| 7,174,536 B1 | 2/2007 | Kothari et al. |
| 7,343,585 B1 | 3/2008 | Lau et al. |
| 7,860,842 B2 | 12/2010 | Bronnikov et al. |
| 8,296,744 B2 | 10/2012 | Langworthy et al. |
| 9,081,873 B1 | 7/2015 | Bawcom et al. |
| 9,116,955 B2 | 8/2015 | Schechter et al. |
| 2004/0150644 A1 | 8/2004 | Kincaid et al. |
| 2007/0233655 A1 | 10/2007 | Engels |
| 2008/0082984 A1* | 4/2008 | McDaniel ............... G06F 8/311 718/106 |
| 2011/0173597 A1 | 7/2011 | Cascaval et al. |
| 2012/0005190 A1 | 1/2012 | Faerber et al. |
| 2012/0066667 A1 | 3/2012 | Mascaro et al. |
| 2012/0304153 A1* | 11/2012 | Li .............................. G06F 8/75 717/123 |
| 2013/0104107 A1 | 4/2013 | De smet et al. |
| 2013/0290292 A1 | 10/2013 | Weyerhaeuser et al. |
| 2014/0304251 A1 | 10/2014 | Bornea et al. |
| 2015/0363229 A1* | 12/2015 | Wang .................... G06F 9/4881 718/103 |
| 2016/0092211 A1 | 3/2016 | Atanasiu et al. |

OTHER PUBLICATIONS

Mui, et al., "Preventing SQL Injection through Automatic Query Sanitization with ASSIST", In Proceedings of Fourth International Workshop on Testing, Analysis and Verification of Web Software, Sep. 21, 2010, pp. 27-38.

Gatterbauer, Wolfgang, "Databases will Visualize Queries too", In Proceedings of 37th International Conference on Very Large Data Bases, vol. 4, No. 12, Aug. 29, 2011, pp. 1498-1501.

"Final Office Action Issued in U.S. Appl. No. 15/195,657", dated Sep. 12, 2019, 15 Pages.

"Non Final Office Action Issued in U.S. Appl. No. 15/195,657", dated May 22, 2019, 14 Pages.

"Final Office Action Issued in U.S. Appl. No. 15/195,657", dated Oct. 17, 2018, 17 Pages.

"Non Final Office Action Issued in U.S. Appl. No. 15/195,657", dated May 30, 2018, 19 Pages.

* cited by examiner

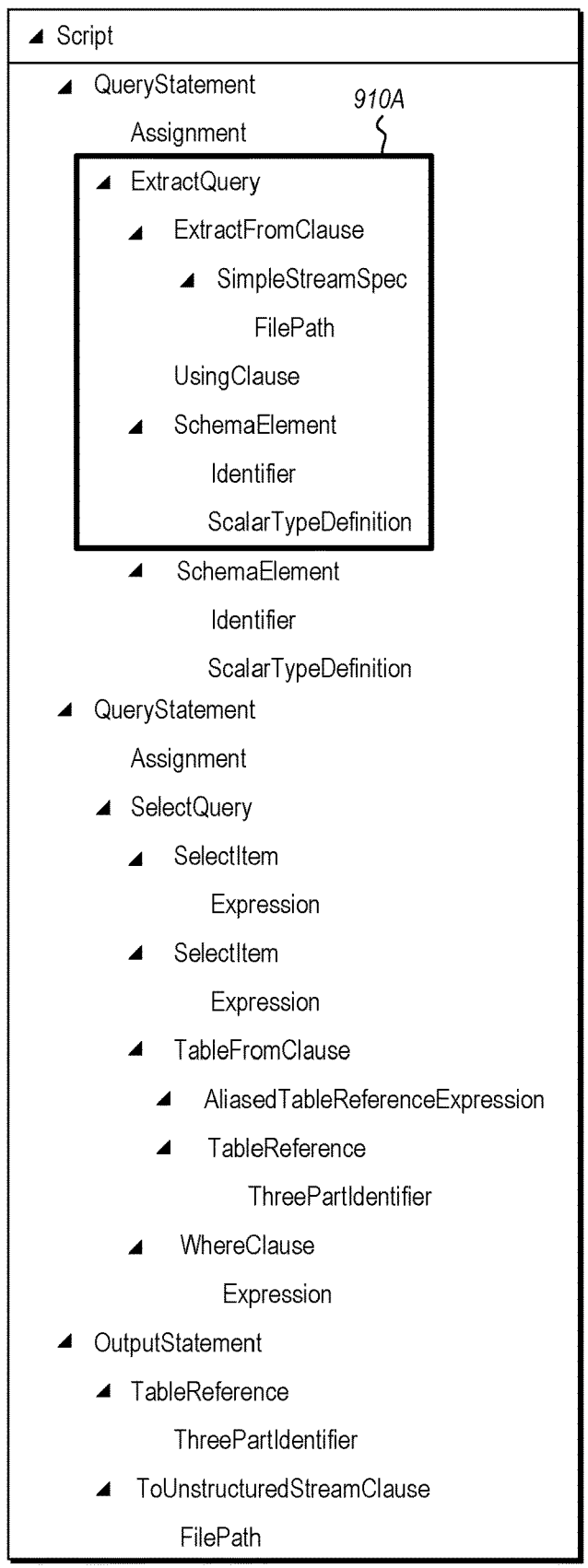
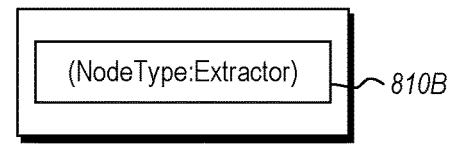
*Figure 9B*
*Figure 9A*

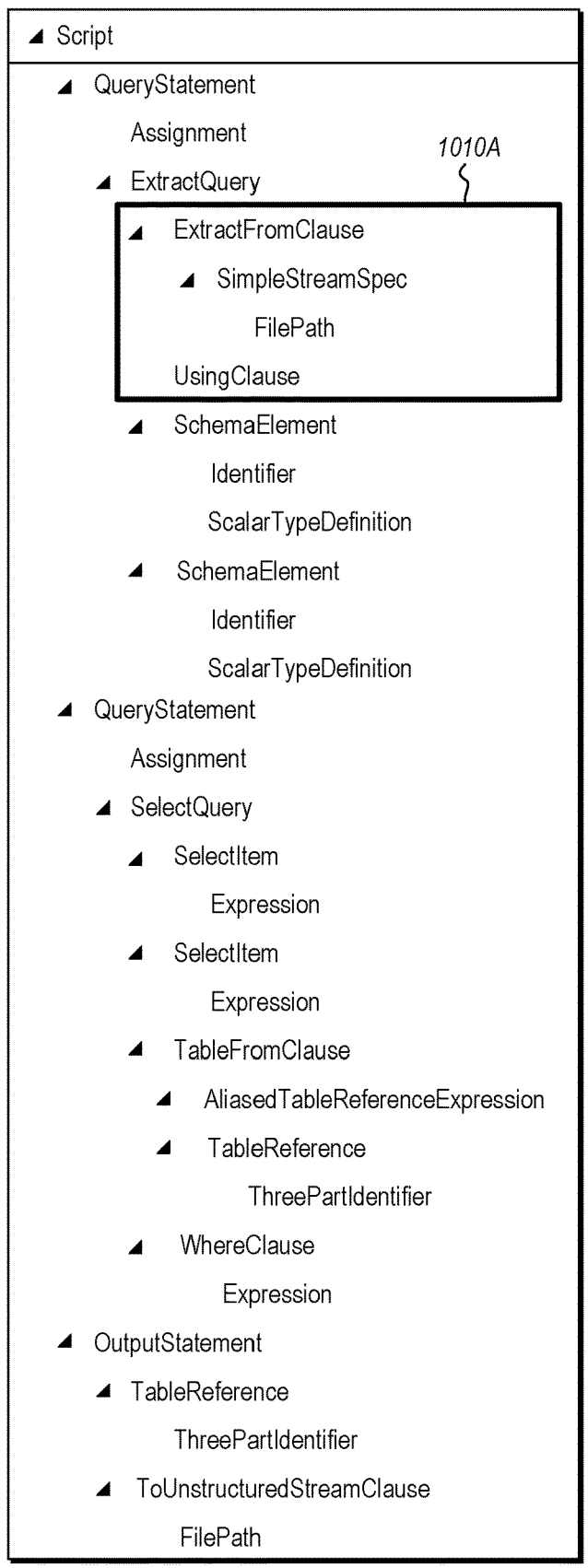
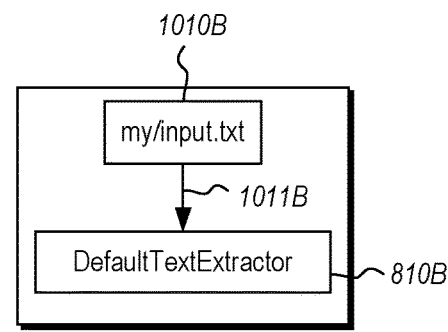
*Figure 10B*
*Figure 10A*

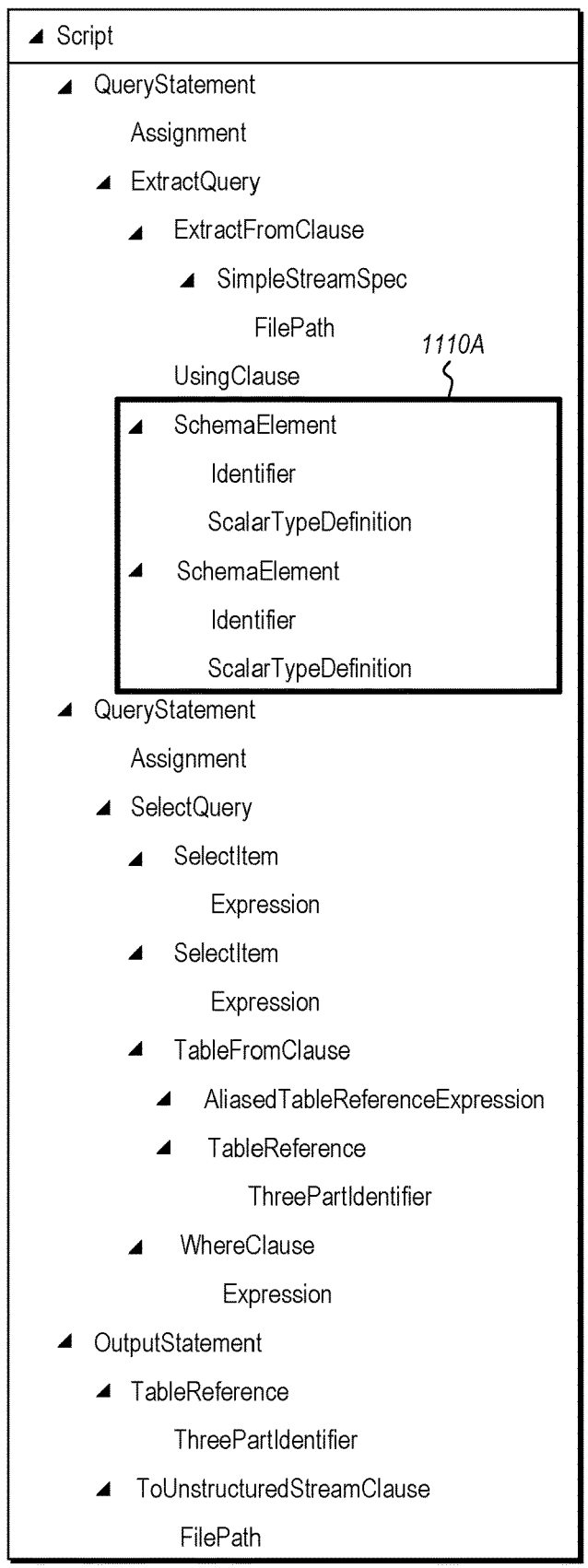
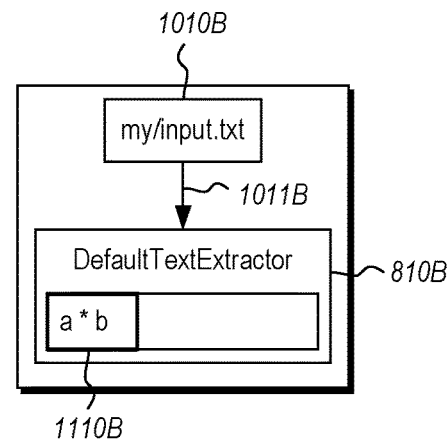
*Figure 11B*
*Figure 11A*

GENERATION OF DATA FLOW FROM SYNTAX TREE

CROSS-REFERENCE TO RELATED APPLICATION

This application claims the benefit of U.S. Provisional Patent Application Ser. No. 62/233,967 filed Sep. 28, 2015, which provisional patent application is incorporated herein by reference in its entirety.

BACKGROUND

Computing systems and associated networks have revolutionized the way human beings work, play, and communicate. Nearly every aspect of our lives is affected in some way by computing systems. More recently cloud computing has enabled users to offload much of the processing, storage, network I/O, memory, and other resource usage to various datacenters. This offloading of hardware capability is often referred to as Infrastructure As A Service (IAAS). Datacenters can also provide Platforms As A Service (PAAS), and event Software As a Service (SAAS). Since the users themselves typically do not know have to be concerned about which datacenter or computing system are providing such hardware and software, the user is now able to be less concerned about the location of the hardware that is supporting the service, or how the services are being accessed. To the user, it is as though the user is simply reaching up into the nearest cloud or portion of the sky to obtain the desired computing service. The service seems ever present.

With data now often being moved into the cloud, the ability to store large quantities of data has improved greatly, enabling a technology field often referred to simply as "Big Data". For instance, big data queries may be processed against very large quantities of data, and those queries are efficiently processed in the cloud computing environment, allowing rapid return of results. Big data queries, like normal database queries, are typically declarative in form and are often referred to as "query script" or "script". There currently exist a variety of languages in which big data queries may be authored. When queries are processed, they are first parsed into tokens, and then the grammar set appropriate for the script language is then used to construct a syntax tree (also sometimes referred to as an "Abstract Syntax Tree" or AST).

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least one embodiment described herein relates to a computerized mechanism to formulate a data flow representation from a syntax tree. The syntax tree may be, for instance, an abstract syntax tree (AST) that is formulated by compiling query script, such as big data query script. Each node in the syntax tree is composed of one or more tokens (script portions) that are taken from the query script, with relationships between the tokens being syntactically represented by links between those tokens. Accordingly, the data flow representation may also be a data flow representation of the original query script itself. The data flow representation may be visualized to an author or reviewer of the query script.

In order to formulate the data flow representation from the syntax tree, the data types of the various inputs and outputs of the syntax tree nodes are identified and bound to a corresponding data flow. This may be performed whilst honoring dependencies between the nodes. For instance, beginning at the parent node of the syntax tree, the input data type of the input(s) to the node are identified. Then, the token(s) of that node and their relationships are evaluated using a grammar set of the query language in which the query script is written to identify output data types of outputs from that node. These outputs are then provided to further nodes in the syntax tree, and thus the input data types of those nodes are identified based on the output data types of the node from which the dependent nodes depend. Accordingly, this process may repeat for each node until all data types of all flows are identified. The data flow representation may be constructed using the syntax tree as a base and augmenting with the discovered data types of the various data flows.

The generation of the data flow representation is an automated process. When an author writes a query script, the data flow representation may be dynamically generated. When the author changes the query script, the data flow representation might likewise change. This mechanism thus allows the author to intuitively see the data flows that the query script will cause to happen, allowing the author to make corrections and/or verify proper expected data flows. Furthermore, a new user may take the query script of another author and quickly see how the data flow of the query script would operate. This allows for more efficient drafting of correct and intended query script, and for the efficient evaluation of the same.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIGS. 8A through 16B represent various processing stages in order to automatically generate the data flow representation of FIG. 7 from the syntax tree of FIG. 6;

FIG. 8A shows that the entire first query statement is first evaluated;

FIG. 9A shows that the extract query portion (the child of the portion of FIG. 8A) is next evaluated;

FIG. 9B shows the resulting data flow representation after having evaluated the portion shown in FIG. 9A;

FIG. 10A shows that the extract from portion (the first child of the portion of FIG. 9A) is next evaluated;

FIG. 10B shows the resulting data flow representation after having evaluated the portion shown in FIG. 10A;

FIG. 11A shows that the schema elements portions (the second and third children of the portion of FIG. 9A) are next evaluated;

FIG. 11B shows the resulting data flow representation after having evaluated the portions shown in FIG. 11A;

FIG. 16B shows the resulting data flow representation after having evaluated the portions shown in FIG. 16A.

DETAILED DESCRIPTION

Figure 1:
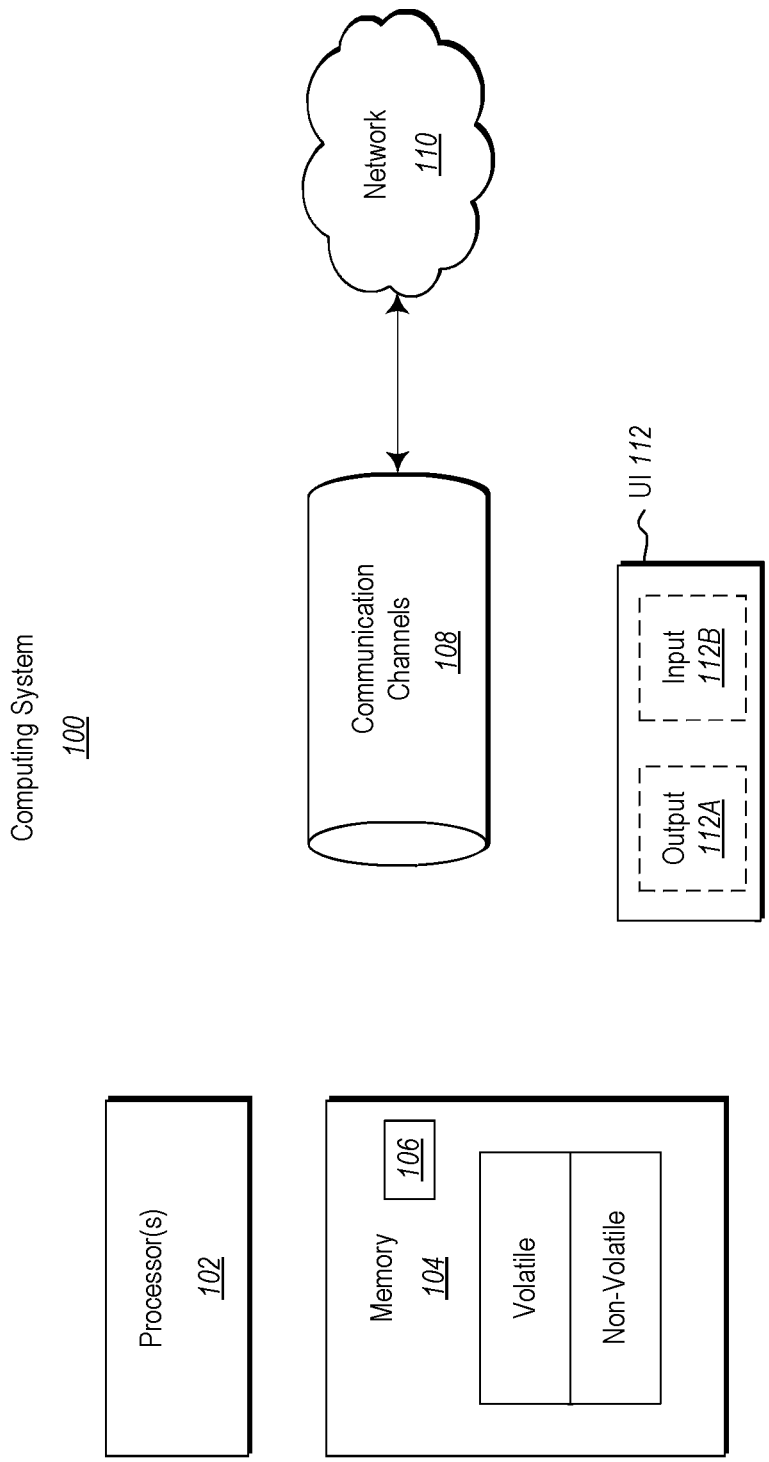
FIG. 1 illustrates an example computing system in which the principles described herein may be employed.

At least one embodiment described herein relates to a computerized mechanism to formulate a data flow representation from a syntax tree. The syntax tree may be, for instance, an abstract syntax tree (AST) that is formulated by compiling query script, such as big data query script. Each node in the syntax tree is composed of one or more tokens (script portions) that are taken from the query script, with relationships between the tokens being syntactically represented by links between those tokens. Accordingly, the data flow representation may also be a data flow representation of the original query script itself. The data flow representation may be visualized to an author or reviewer of the query script.

In order to formulate the data flow representation from the syntax tree, the data types of the various inputs and outputs of the syntax tree nodes are identified and bound to a corresponding data flow. This may be performed whilst honoring dependencies between the nodes. For instance, beginning at the parent node of the syntax tree, the input data type of the input(s) to the node are identified. Then, the token(s) of that node and their relationships are evaluated using a grammar set of the query language in which the query script is written to identify output data types of outputs from that node. These outputs are then provided to further nodes in the syntax tree, and thus the input data types of those nodes are identified based on the output data types of the node from which the dependent nodes depend. Accordingly, this process may repeat for each node until all data types of all flows are identified. The data flow representation may be constructed using the syntax tree as a base and augmenting with the discovered data types of the various data flows.

The generation of the data flow representation is an automated process. When an author writes a query script, the data flow representation may be dynamically generated. When the author changes the query script, the data flow representation might likewise change. This mechanism thus allows the author to intuitively see the data flows that the query script will cause to happen, allowing the author to make corrections and/or verify proper expected data flows. Furthermore, a new user may take the query script of another author and quickly see how the data flow of the query script would operate. This allows for more efficient drafting of correct and intended query script, and for the efficient evaluation of the same.

Some introductory discussion of a computing system will be described with respect to FIG. 1. Then, the general structure and operation of a mechanism to formulate a data flow representation from a syntax tree generated by parsing of a query script will be described with respect to FIGS. 2 through 5. Finally, a specific example of such a mechanism as applied to specific query script will be described with respect to FIGS. 6 through 16B.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "monitor", "scheduler", "manager", "module", "compiler", "virtual machine", "container", "environment" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, projectors, tactile output, valves, actuators, holograms, virtual reality environments, and so forth. Examples of input mechanisms 112B might include, for instance, microphones, touchscreens, holograms, cameras, keyboards, accelerometers, levers, pedals, buttons, knobs, mouse of other pointer input, sensors of any type, a virtual reality environment, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation)

before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
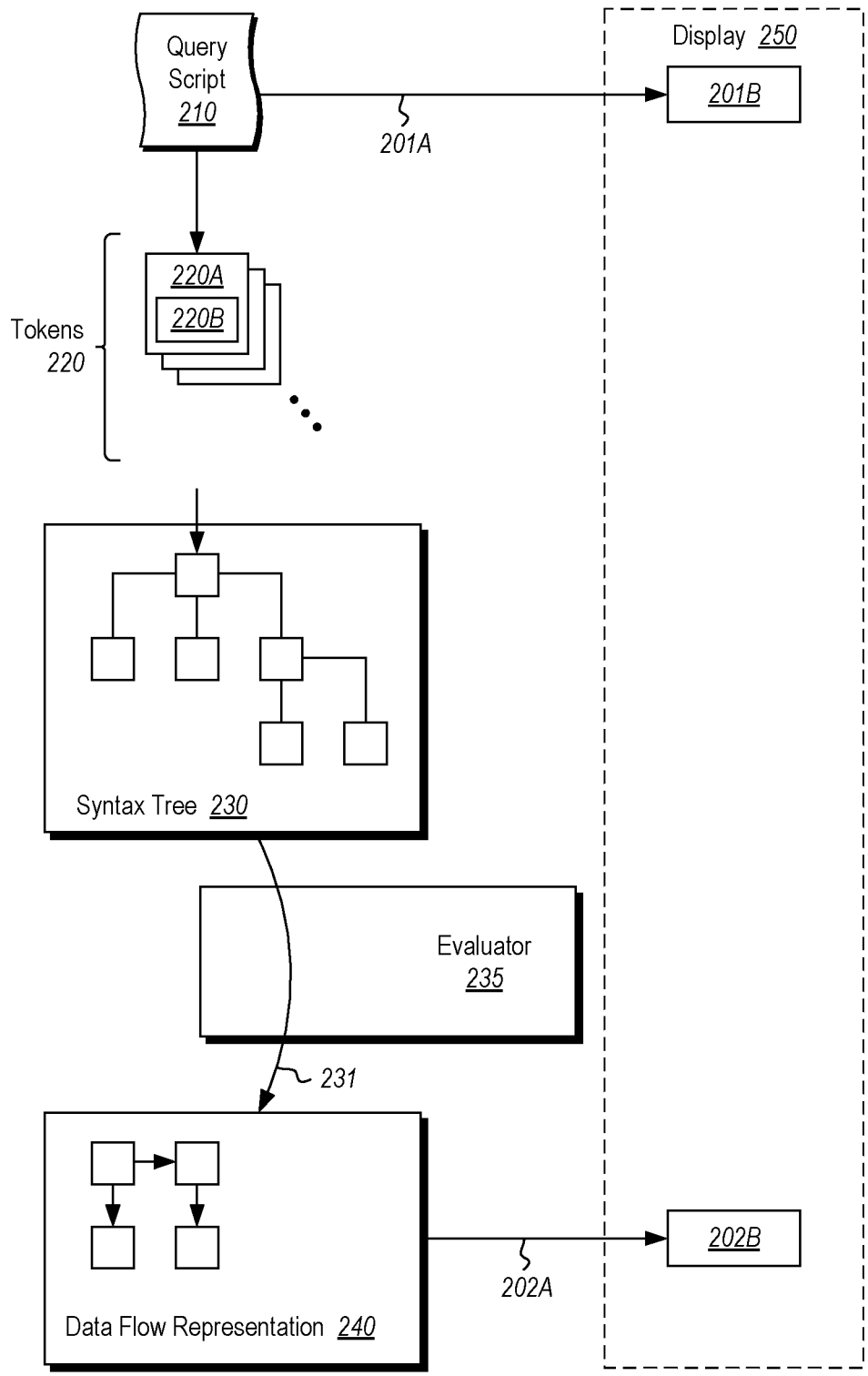
FIG. 2 illustrates a flow representing a process for formulating a data flow representation of a query script in accordance with the principles described herein.

FIG. 2 illustrates a flow 200 representing a process for formulating a data flow representation of a query script in accordance with the principles described herein. The flow 200 begins with a query script 210. An example of a query script will be described with respect to FIGS. 6A through 16B. The query script is drafted in accordance with a query language. In some embodiments, the query language is a big data query language. Examples of big data query languages include Hive query language, Spark SQL, BigQuery, although there are numerous other examples of big query languages. The principles described herein are not limited to any particular big query language, and are not limited to big query languages at all. In some embodiments, the query script may be visualized (as represented by arrow 201A) into a visual representation 201B that is output on a display 250. For instance, if the process occurs on the computing system 100 of FIG. 1, the query script may be visualized on a display represented as one of the output devices 102A.

The script query is first parsed (as represented by arrow 211) into multiple tokens 220. This may be performed by, for instance, the parser of a compiler. The token 220A is illustrated as including a script location identifier 220B. Although not required, each of one, some or all of the tokens may have a corresponding script location identifier that identifies what portion of the script the token is located in. For instance, the script location identifier might be a line identifier. Conventionally, parsers do not correlate tokens with the location of the script that the token came from.

The collection of tokens 220 is then formulated (as represented by arrow 221) into a syntax tree 230 comprising multiple nodes, each including one or more tokens. The formulation of tokens into syntax trees are known in the art and thus will not be described in detail herein. However, unlike conventional formulation of syntax trees, in some embodiments, the tokens may have script location identifiers associated therewith, and some or all of those script location identifiers remain associated with the tokens when the tokens are included within nodes of the syntax tree.

The syntax tree 230 is then evaluated by an evaluator 235 to thereby generate (as represented by arrow 231) a data flow representation 240 of the syntax tree. As represented by arrow 202A, a visualization 202B of the data flow representation may be presented on the display 250. For instance, if the process occurs on the computing system 100 of FIG. 1, the data flow visualization 202B may be visualized on a display represented as one of the output mechanisms 112A.

Figure 3A:
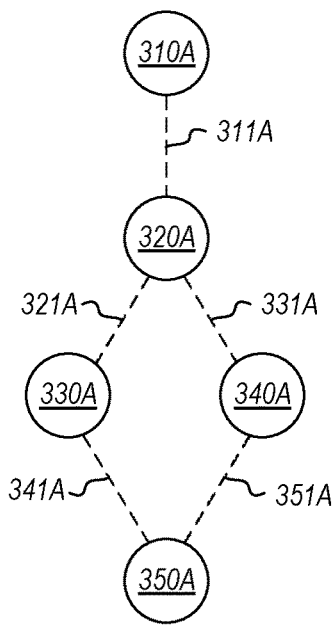
FIG. 3A represents an example of a syntax tree that is used throughout the description.

FIG. 3A represents an example of a syntax tree 300A and will be used as an example throughout the remainder of this description. However, the principles described herein apply regardless of the particular structure of the syntax tree 300 and the precise structure of the syntax tree 300 will depend on the content of the query script and the query language in which the query script is authored. In this particular syntax tree 300, there are five nodes shown including nodes 310A, 320A, 330A, 340A and 350A. Each node of the syntax tree 300A is symbolically illustrated in FIG. 3A as a circle. Furthermore, there are five relation 311A, 321A, 331A, 341A and 351A. Each relation of the syntax tree is symbolically illustrated in FIG. 3A as a dotted line.

Figure 3B:
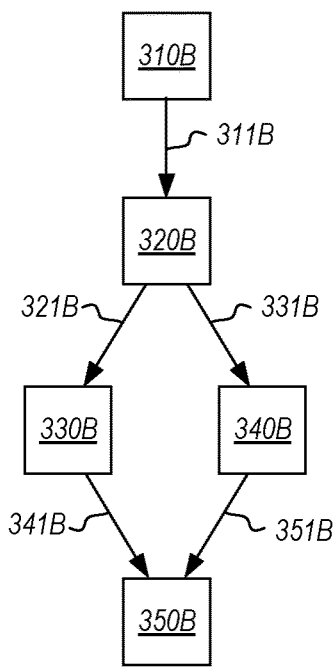
FIG. 3B represents an example of a data flow representation corresponding to the syntax tree of FIG. 3A.

FIG. 3B represents an example of a data flow representation 300B, and is similar to the syntax tree 300A of FIG. 3A. In the illustration of FIG. 3B, each node of the data flow representation 300B is represented as a square, and each flow is represented as an arrow line. In this example, there is one node of the data flow representation 300B corresponding to each node of the syntax tree 300A. For instance, nodes 310A, 320A, 330A, 340A and 350A of the syntax tree 300A correspond to respective nodes 310B, 320B, 330B, 340B and 350B of the data flow representation 300B. Furthermore, there is one data flow 311B, 321B, 331B, 341B and 351B for each corresponding link 311A, 321A, 331A, 341A and 351A of the syntax tree 300A.

However, data flows often do not have one to one representations between links in the syntax diagram and data flows, and often there may be one or more nodes of a syntax tree in a single node of a data flow. Accordingly, the similarity in appearance between the syntax tree 300A of FIG. 3A and the data flow representation 300B of FIG. 3B is merely for purpose of clarity in explaining the principles described herein.

Figure 4:
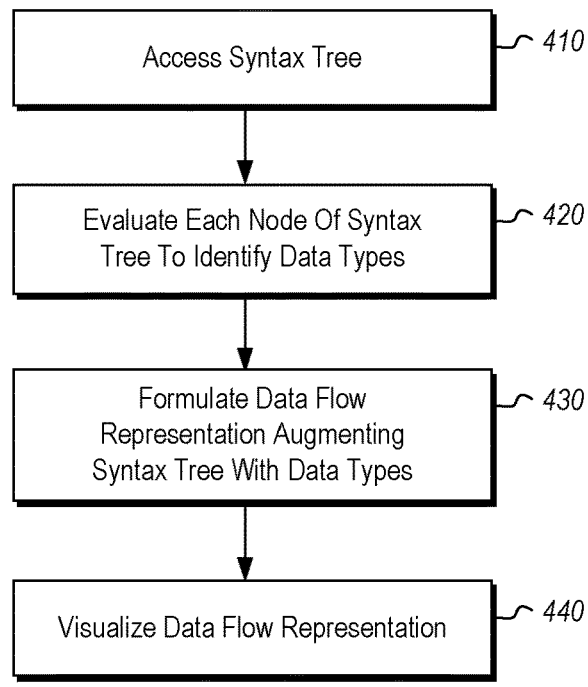
FIG. 4 illustrates a flowchart of a method for generating a data flow representation from a syntax tree in accordance with the principles describe herein.

FIG. 4 illustrates a flowchart of a method 400 for generating a data flow representation from a syntax tree. The method 400 may be performed by the evaluator 235 of FIG. 2 for example, to build the data flow representation 240 from the syntax tree.

The method 400 includes first accessing (act 410) the syntax tree. For instance, in FIG. 2, the evaluator 235 access the syntax tree 230. Again, an example of the syntax tree 230 is the syntax tree 300A of FIG. 3A.

Figure 5:
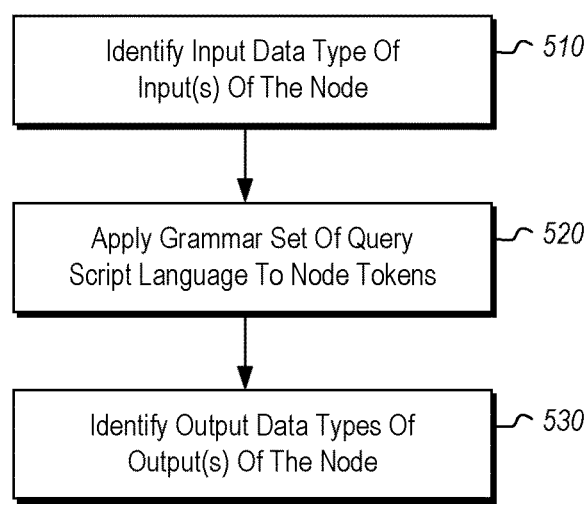
FIG. 5 illustrates a flowchart of a method for evaluating a node of the syntax tree and represents one example of how the act 420 of FIG. 4 may be performed.

The evaluator then evaluates (act 420) each of at least some of the nodes of the syntax tree to identify the various data types of the node. For instance, the evaluator 235 of FIG. 2 evaluates each node of the syntax tree in order to identify the data types of input(s) and output(s) of the node. If the syntax tree 230 were structured as the syntax tree 300A of FIG. 3A, the evaluator would perform the act 420 for each of the nodes 310A, 320A, 330A, 340A and 350A of the syntax tree. FIG. 5 illustrates a flowchart of a method 500 for evaluating a node of the syntax tree and represents one example of how the act 420 may be performed. FIG. 5 will be explained in detail further below.

The evaluator then formulates (act 430) a data flow representation based on the syntax tree and augmented with the data types identified in the acts of evaluating. For instance, in FIG. 2, the evaluator 235 formulates the data flow representation 240.

The method 400 is also represented as including an act of causing the data flow representation to be visualized (act 440). This is represented in FIG. 2 by the arrow 202A. The visualization 202B of the data flow representation may include multiple visualized nodes, perhaps one for each of the nodes of the data flow representation. For instance, if the data flow representation were the data flow representation 300B of FIG. 3B, the data flow representation 300B might also include five node representations.

In some embodiments, for at least some of the visualized nodes, the visualized node correlates to a portion of the query script using the script location identifier for at least one token of at least one node of the visualized node. Furthermore, in some embodiments, for at least one of those visualized nodes, the visualized node has a control that, when interacted with by a user, causes the correlated portion of the query script to be visually emphasized.

As previously mentioned, in order to generate the data flow representation, the evaluator evaluates (act 420) each of at least some of the nodes of the syntax tree. FIG. 5 illustrates a flowchart of a method 500 for evaluating a node of the syntax tree. The goal of the evaluation of each node is to identify a data type of any output(s) from that node.

First, the evaluator identifies (act 510) a data type of one or more inputs to the node of the syntax tree. It may be that there are no inputs to the node of the syntax tree. In that case, act 510 may be skipped. Furthermore, it may be that due to upstream nodes not having been evaluated yet, the data type of one of the input(s) to the node may not yet be identifiable. In that case, the method 500 is deferred for that particular node of the syntax tree.

Accordingly, the evaluation of nodes is subject to evaluation of an order of dependency of the nodes of the syntax tree. For instance, referring to FIG. 3A, node 310A is evaluated so that the data types of the inputs 311B to the node 320A may be identified. Furthermore, node 320A is evaluated prior to nodes 330A and 340A so that the inputs 321B and 331B to the respective nodes 330A and 340A may be identified. Nodes 230A and 240A are then evaluated so that inputs 341B and 351B to the node 350A may be identified.

Once the input data type of the input(s) (if any) are determined for a given node of the syntax tree, the grammar set of the query script may then be applied to the one or more tokens of the node (act 520) to thereby identify (act 530) output data types of output(s), if any, of the node of the syntax tree.

The method 500 of FIG. 5 will now be described with respect to the syntax tree 300A of FIG. 3A. In order to generate the data flow representation 300B of FIG. 3B, the data types of each of the input(s), if any, and the output(s), if any, of the nodes of the syntax tree 300A are determined. To do so, the method 500 is applied to each node of the syntax tree 300A beginning at node 310A, which is a dependee node for all other nodes of the syntax tree 300A.

As for node 310A, the data types of the input(s) of the node 310A are identified (act 510). In the case of node 310A, there are no inputs to the node 310A. The grammar rules of the query language are then applied (act 520) to the token(s) of the node in order to identify (act 530) an output data type 311B of the node 310A. By so doing, node 310B having output data flows 311B may be formulated (see FIG. 3B). Node 320A is then ready to be evaluated, being a dependent node from node 310A, and given that the output data type of the output of its dependee node 310A has been determined.

Again, the method 500 is performed, this time for node 320A. As for node 320A, the input(s) of the node 320A are identified (act 510). The input data type of the input of the node 320A in this case is the same as the output type of the output 311B of the node 310B. Accordingly, the input data type can be readily identified. Now, the grammar rules of the query language are applied (act 520) to the token(s) of the node 320A in order to identify (act 530) an output data type 321B and 331B of the node 320A. By so doing, node 320B having output data flows 321B and 331B may be formulated (see FIG. 3B). Either and both of nodes 330A and 340 are then ready to be evaluated.

When the method 500 is performed for node 330A, the input(s) of the node 330A are identified (act 510). The input data type of the input of the node 330A in this case is the same as the output data type of the output 321B of the node 320B. Accordingly, the input data type can be readily identified. Now, the grammar rules of the query language are applied (act 520) to the token(s) of the node 330A in order to identify (act 530) an output data type 341B of the node 330A. By so doing, node 330B having output data flow 341B may be formulated (see FIG. 3b).

When the method 500 is performed for node 340A, the input(s) of the node 340A are identified (act 510). The input data type of the input of the node 340A in this case is the same as the output data type of the output 331B of the node 320B. Accordingly, the input data type can be readily identified. Now, the grammar rules of the query language are applied (act 520) to the token(s) of the node 340A in order to identify (act 530) an output data type 351B of the node 340A. By so doing, node 340B having output data flow 341B may be formulated.

The method 500 may now be performed for node 350A. The input types of inputs to the node 350A are identified (act 510). The input data types of the inputs of the node 350A in this case is the same as the output data type of the output 341B of the node 330B, and the same as the output data type of the output 351B of the node 340B. There is no need to perform act 520 and 530 with respect to node 350A since there are no output data flows from the node 350A. Accordingly, node 350B of the data flow representation 300B may be formulated, thereby completing the formulation of the data flow representation 300B of FIG. 3B.

A description of how query script may be used to generate a data flow representation diagram will now be described with respect to a specific example. In this example, the grammar of the query script is defined by a grammar language called yacc. The grammar definition consists of tokens for language keywords. The following are some example token definitions:

```
%token <Token> _SCRIPT #SCRIPT#
%token <Token> _SELECT #SELECT#
%token <Token> _SEMIJOIN #SEMIJOIN#
%token <Token> _SEQUENCE #SEQUENCE#
```

For instance, the _SELECT token is for the text SELECT. The yacc grammar definition also includes construct definitions. For instance, the following is a construct definition for select_query:

```
select_query:
    _SELECT opt_distinct opt_top select_
    item_list opt_select_query_clause_list
    {
        $$ = new SelectQuery($1, $2, $3, $4, $5);
    }
    ;
```

The definition of the "select_query" construct starts with the _SELECT token followed by the other constructs. The language in its entirety is defined this way. The script may be parsed based on this grammar to build an abstract syntax tree (AST) from the script. In this case, when the parser encounters the select_query construct, a new SelectQuery node will be created for the AST.

The following is an example query script that will be described hereinafter as a more detailed example.

```
rs1 =
    EXTRACT a : int, b : int
    FROM "my/input.txt"
    USING DefaultTextExtractor;
rs2 =
    SELECT a, b
    FROM rs1
    WHERE b > 5;
OUTPUT rs2
TO "my/testAggOutput.txt";
```

Figure 6:
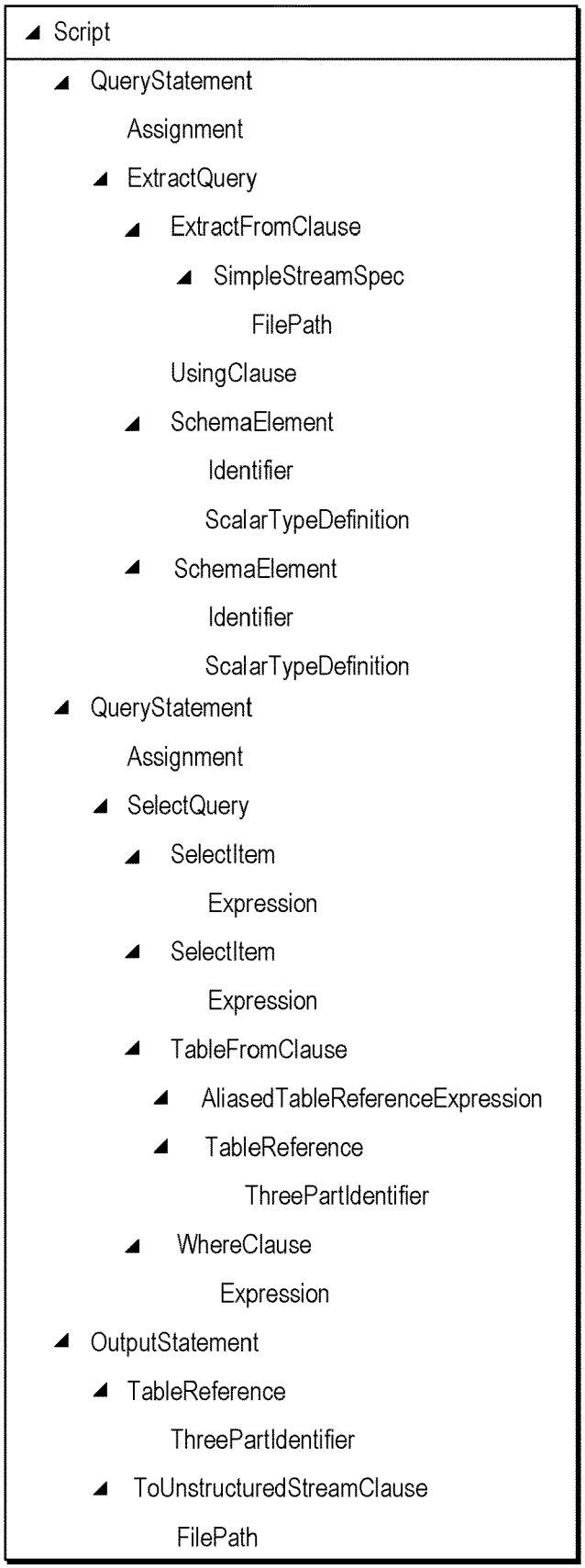
FIG. 6 illustrates a real example syntax tree generated from actual query script that is used as an example herein.
Figure 7:
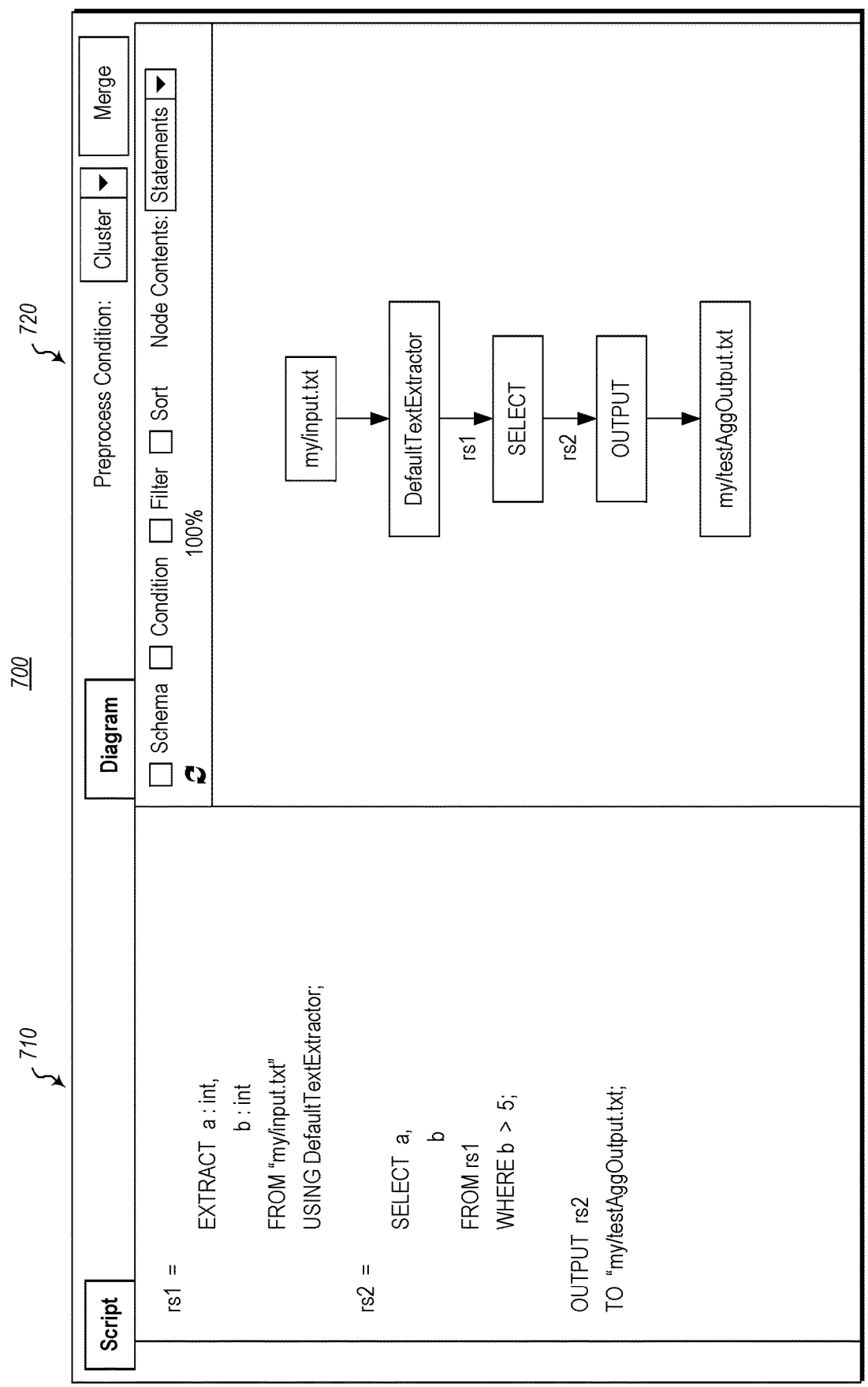
FIG. 7 illustrates a data flow representation generated from the syntax tree of FIG. 6.

Using our grammar written in yacc and the yacc parser, that query script ends up parsing to the syntax tree 600 illustrated in FIG. 6. The query script consists of two query statements (rs1 and rs2) and one output statement at the end. These three statements as the second level child nodes of the top level Script node. In order to build the data flow graph, the abstract syntax tree (AST) is traversed to incrementally build up the data flow representation based on the location of present traversal in the abstract syntax tree. The resultant is a view of the input and how it leads to the output illustrated in FIG. 7. The left portion 710 of FIG. 7 is an example of the query script visualization 201B of FIG. 2. The right portion 720 of FIG. 7 is an example of the data flow representation 202B of FIG. 2.

More regarding the process of generating FIG. 7 (the data flow representation) from FIG. 6 (the syntax tree) will now be described with respect to FIGS. 8A through 16B. In this example, a visitor model is used to parsing the abstract syntax tree of FIG. 6 into the data flow representation of FIG. 7. In this example of the visitor model, each single node in the syntax tree is visited in depth-first order, and define different operations for different node types. In so doing, relationships between nodes are built. For instance, in the operation for assignment node, a dictionary is built from the variable name to the data flow node. In the operation for table reference node, the referenced data flow element node may be obtained from the dictionary. A number of operations for different node types are implemented to fill up the details, such as operations for SchemList may be used to extract the column related information, the operations for WhereConditionClause may be used to get the filter information, and so forth. Since this is depth-first, one implementation is just to fill up the details to the parents.

Figure 8A:
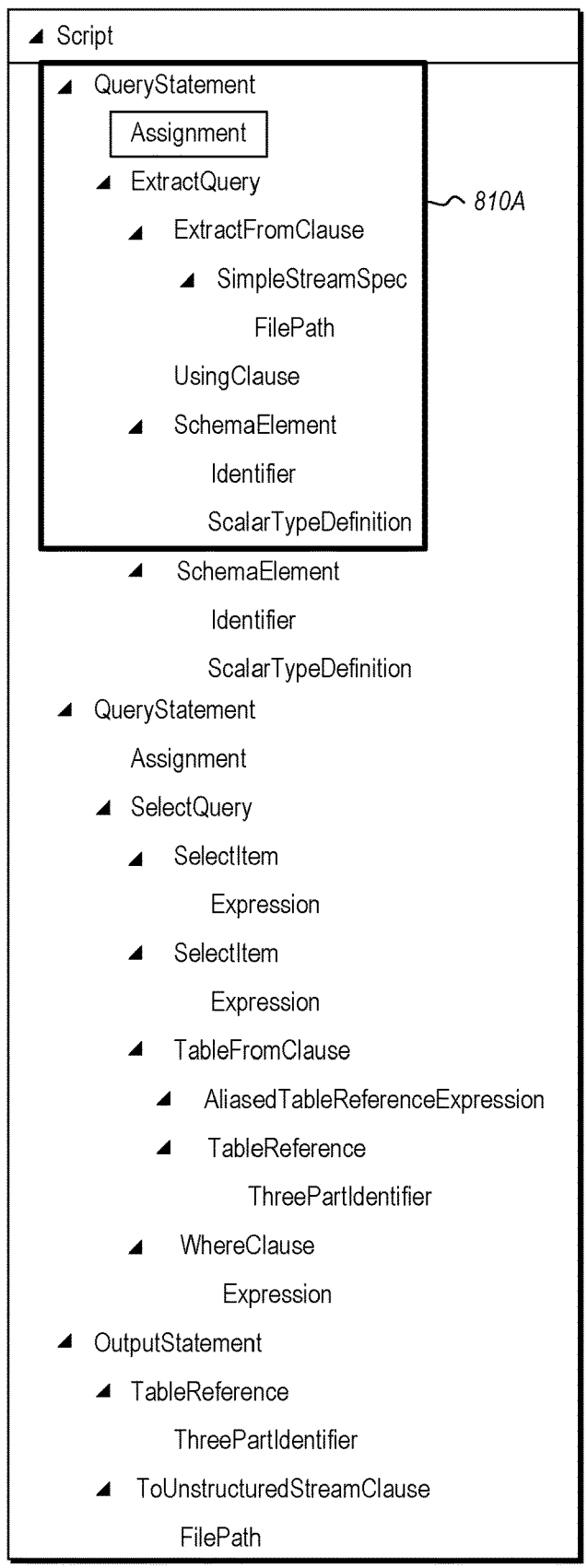
Figure 8B:
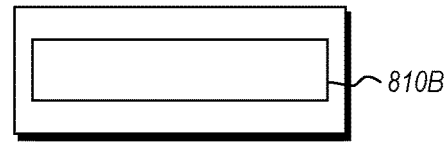
FIG. 8B shows the resulting data flow representation after having evaluated the portion shown in FIG. 8A.

In the visitor model, the entire abstract syntax tree of FIG. 6 is first visited (e.g., the parent node). Next, as represented in FIG. 8A, the visitor visits the node of the syntax tree that is highlighted with box 810A. As represented in FIG. 8B, a data flow representation node 810B. It is an assignment node, so a mapping from rs1 to the current flow is made in the dictionary.

The visitor next goes on to visit the children of this assignment node 810A. As represented in FIG. 9A, the visitor according visits the node of the syntax tree that is highlighted with box 910A. This child is an ExtractQuery, so the data flow representation node 810B is named as an ExtractQuery (or "Extractor") element.

The visitor then goes on to visit the children of the node 910A, which is highlighted with box 1010A in FIG. 10A. This child node is an ExtactFromClause. As shown in FIG. 10B, the related file node 1010B is created according to information from SimpleStreamSpec (as specified in the node 1010A), and add an edge 1011B between the new created node 1010A to the ExtractStatement node 810B. In the Using clause, it is determined to use the DefaultTextExtractor, so this is as the name of the data flow representation node 810B.

As represented by box 1110A in FIG. 11A, the visitor next visits the other child of the assignment node 810A to fill more detailed information in the data flow representation node 810B (as shown by the box 1110B in FIG. 11B).

Figure 12A:
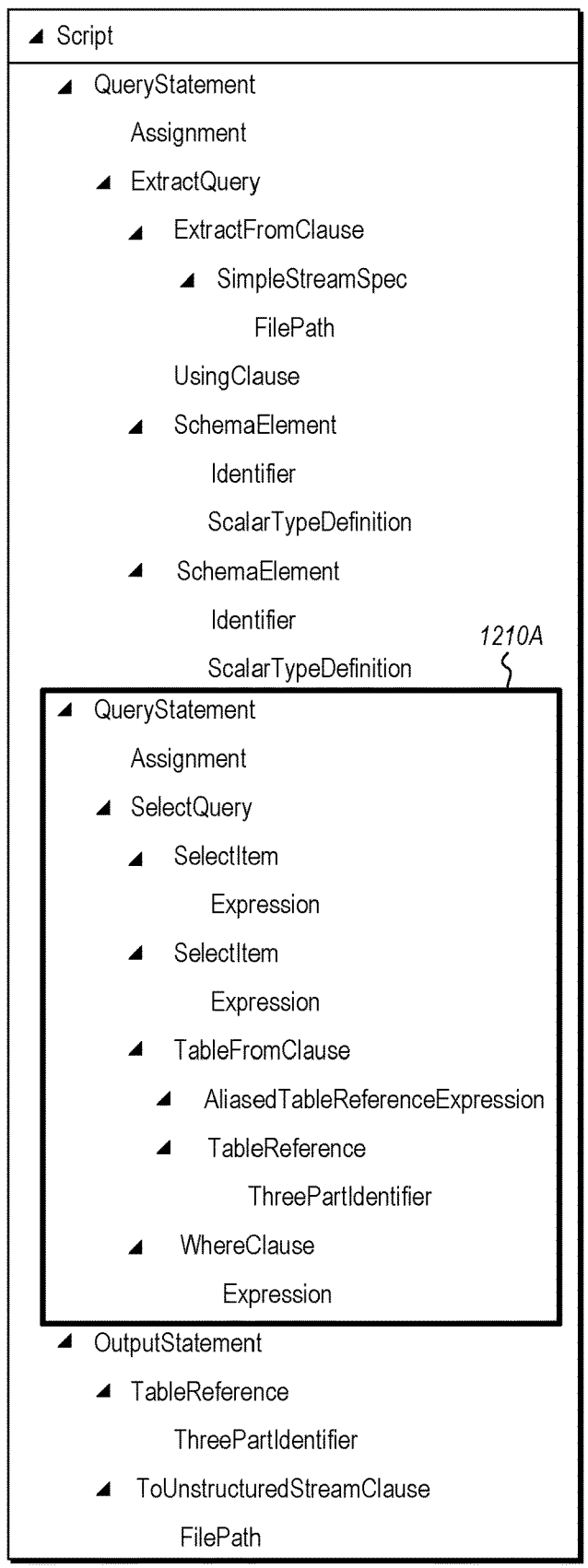
FIG. 12A shows that the entire second query statement is next evaluated.
Figure 12B:
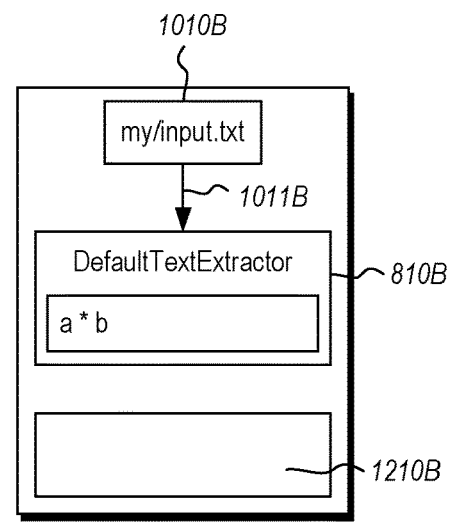
FIG. 12B shows the resulting data flow representation after having evaluated the portion shown in FIG. 12A.

After visiting all nodes from the first statement, the visitor then goes to the second statement represented by the box 1210A in FIG. 12A. Again, the visitor sees that this is an assignment node, and thus a new assignment mapping is created. This causes a new data flow representation node 1210B to be added as represented in FIG. 12B. There is not yet a name for this node 1210B at this point.

Figure 13A:
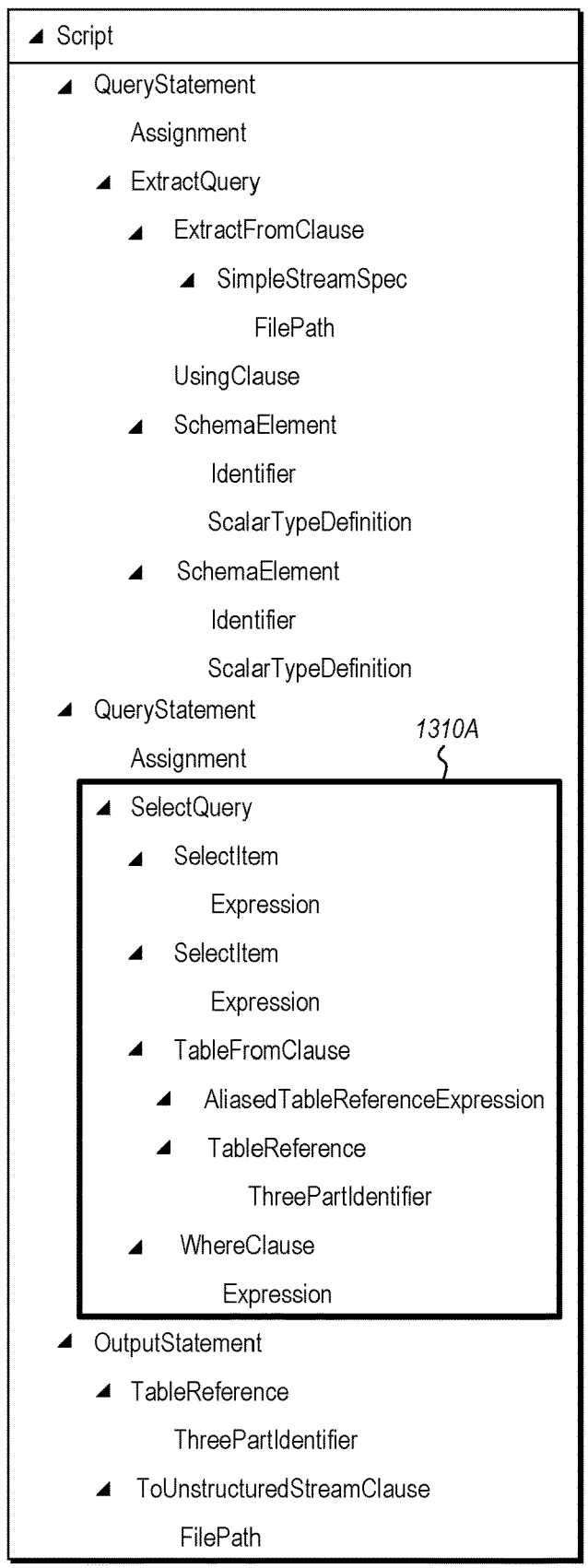
FIG. 13A shows that the select query portion (the child of the portion of FIG. 12A) is next evaluated.
Figure 13B:
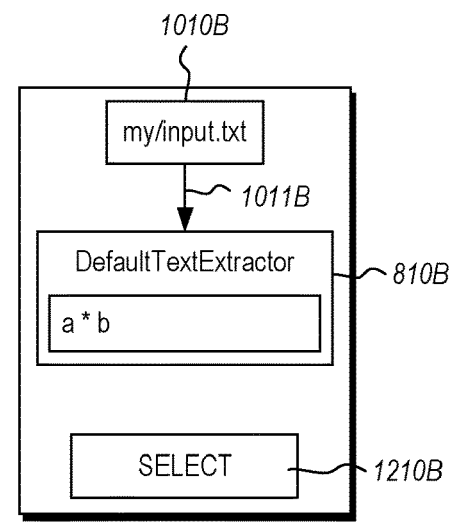
FIG. 13B shows the resulting data flow representation after having evaluated the portion shown in FIG. 13A.

Next, the visitor encounters the child node of the second statement, which is the select node highlighted by box 1310A in FIG. 13A. Accordingly, the data flow representation node 1210B may now be assigned a "select" name.

Figure 14A:
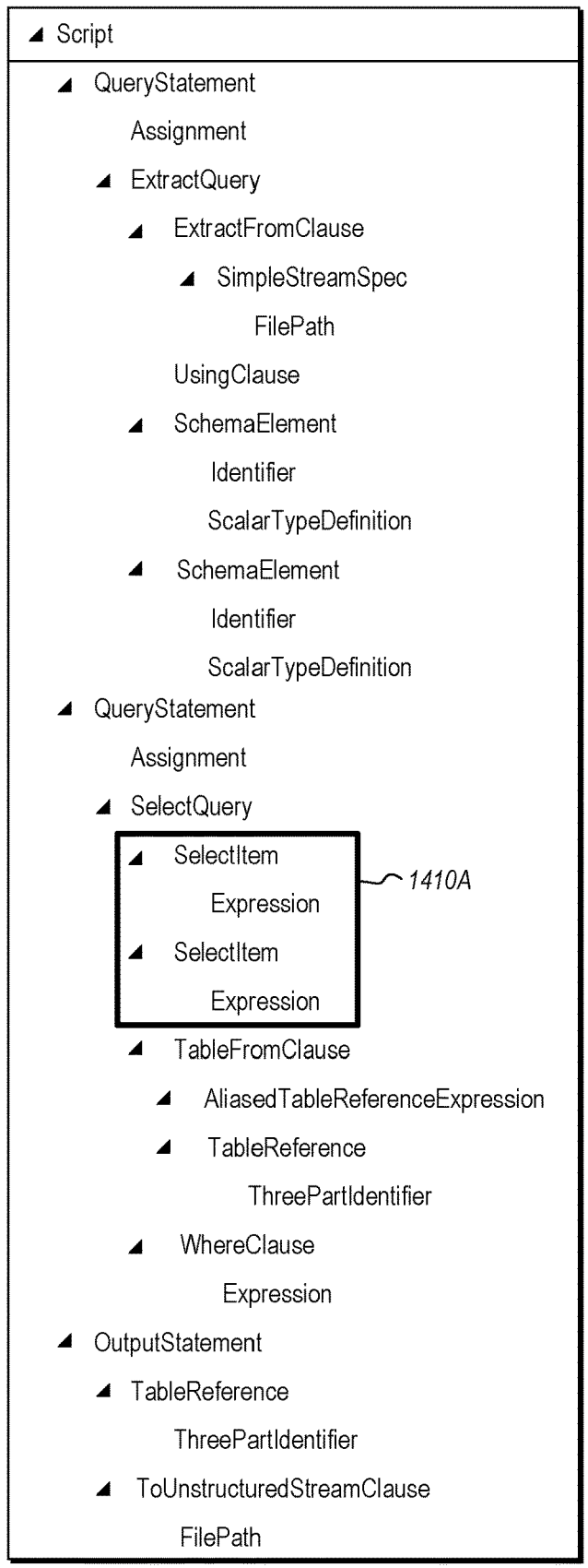
FIG. 14A shows that the select item elements portion (the first and second children of the portion of FIG. 13A) are next evaluated.
Figure 14B:
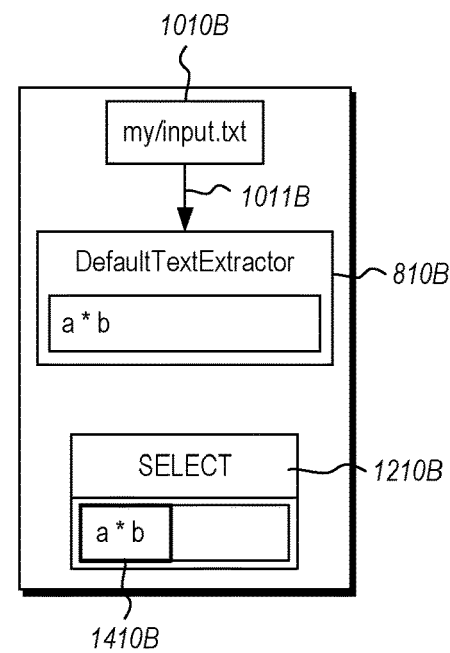
FIG. 14B shows the resulting data flow representation after having evaluated the portions shown in FIG. 14A.

As represented in FIG. 14A, the visitor next encounters the children of node 1310A, the first two of being highlighted with box 1410A in FIG. 14A. As shown in FIG. 14B, the details 1410B for the select node 1210B may now be partially populated.

Figure 15A:
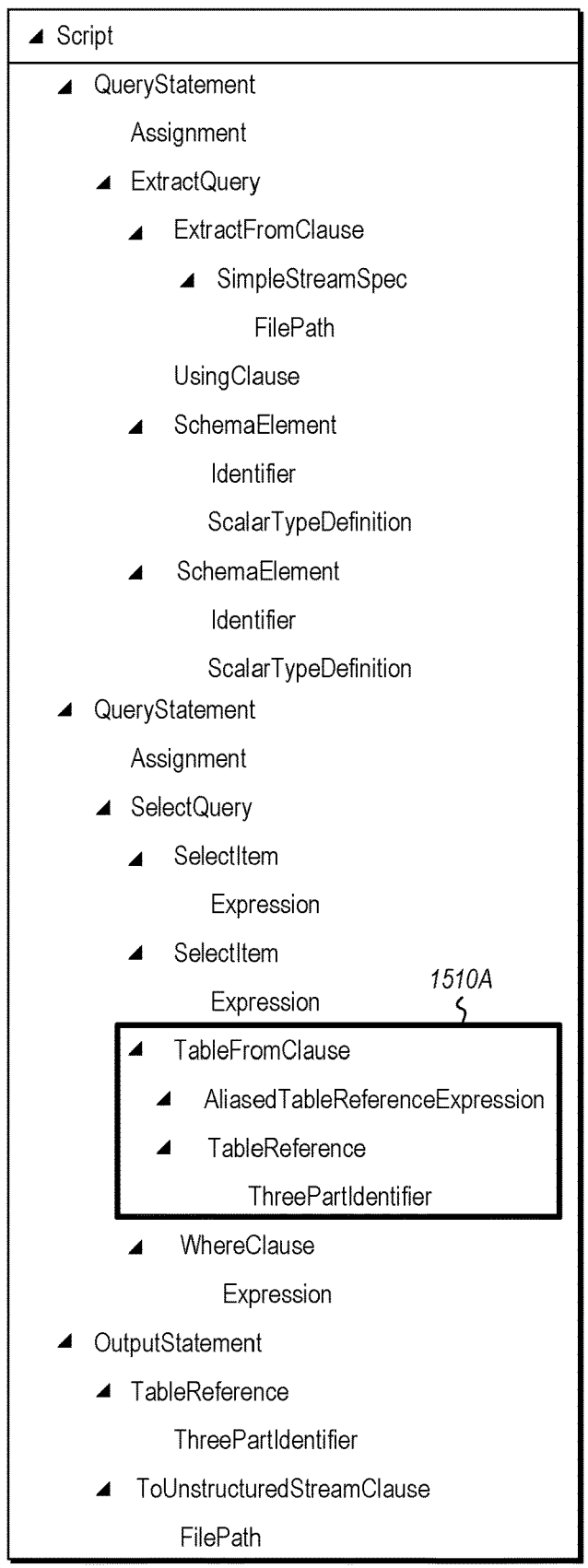
FIG. 15A shows that the table from clause portion (the third child of the portion of FIG. 13A) is next evaluated.
Figure 15B:
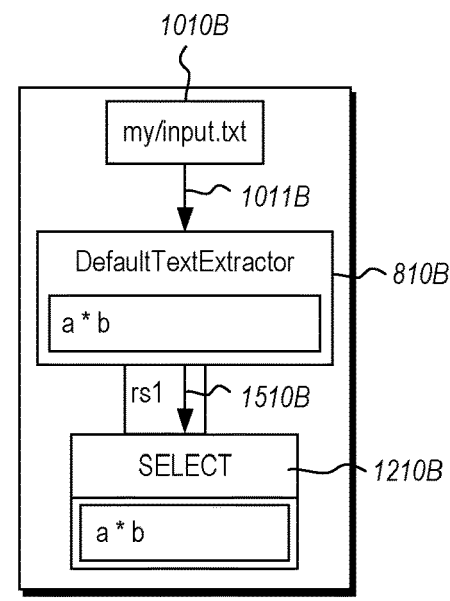
FIG. 15B shows the resulting data flow representation after having evaluated the portions shown in FIG. 15A.

As represented in FIG. 15A, the visitor encounters the third child of node 1310A (as represented by the box 1510A). It has a "TableFromClause". In the table from clause, there is an aliased table name "rs1", so the related data flow representation node may be obtained from the dictionary, and the edge 1510B may be added as represented in FIG. 15B.

Figure 16A:
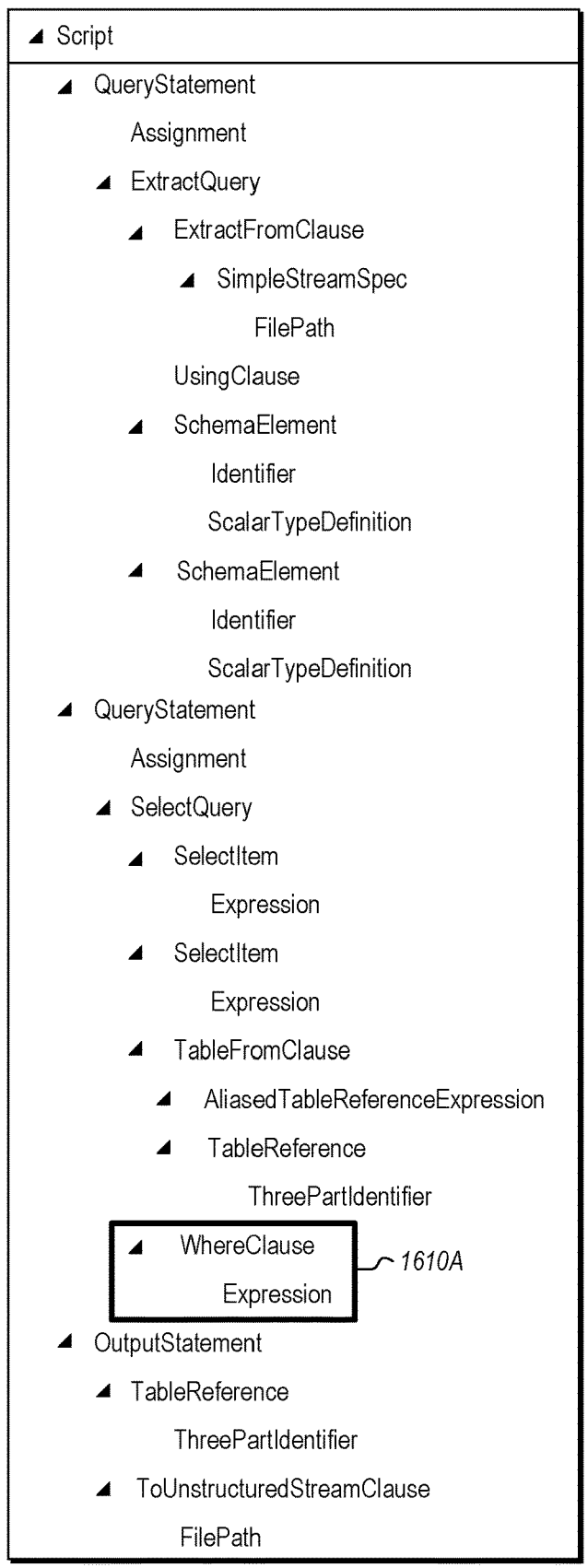
FIG. 16A shows that the table from clause portion (the last child of the portion of FIG. 13A) is next evaluated.
Figure 16B:
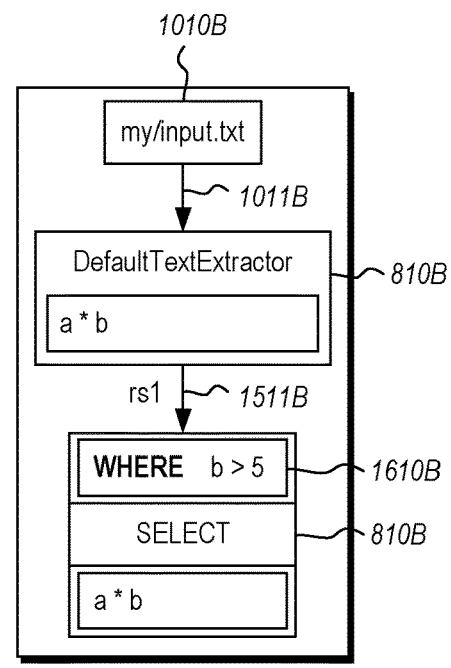

The visitor next encounters the final child node of node 1310A (which is represented by box 1610A in FIG. 16A). In the where clause, the detail information about how the row sets are filtered is obtained. This detailed information (represented by box 1610B) is then filled into the select node 1210B as represented in FIG. 16B.

Accordingly, an effective and automated mechanism for generating a data flow representation from script has been described. When an author writes a query script, the data flow representation may be dynamically generated. When the author changes the query script, the data flow representation might likewise change. This mechanism thus allows the author to intuitively see the data flows that the query script will cause to happen, allowing the author to make corrections and/or verify proper expected data flows. Furthermore, a new user may take the query script of another author and quickly see how the data flow of the query script would operate. This allows for more efficient drafting of correct and intended query script, and for the efficient evaluation of the same.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system configured to generate and dynamically update a data flow representation from a syntax tree that is based on a query script, the data flow representation being dynamically updated in response to changes to the query script in order to facilitate efficient drafting and correction of the query script by visualizing, via the data flow representation, which specific data flows the query script will cause to happen, said computing system comprising:
   one or more processors; and
   one or more computer-readable hardware storage devices that store computer-executable instructions that are executable by the one or more processors to cause the computing system to at least:
      access a syntax tree comprising a plurality of nodes, each node in the plurality of nodes comprising one or more tokens parsed from query script drafted in a query language;
      evaluate each of at least some of the plurality of nodes to do the following for each evaluated node:
         identify a data type of one or more inputs to the node, wherein, for a first node included in the plurality of nodes, identifying a first data type for a first input of the first node is deferred due to one or more upstream nodes not having been evaluated yet such that the first data type is determined after a deferral period;
         apply a grammar set of the query language to the one or more tokens of the node to identify an output data type of one or more outputs from the node; and
         for a particular node in the plurality of nodes, build a dictionary that includes a map mapping a query statement included in the query script to a particular data flow representative of the particular node such that the particular node is obtainable from the dictionary by referencing the query statement;
      formulate a data flow representation based on the syntax tree and augmented with the data types identified during said evaluating; and
      in response to a modification to the query script, dynamically modify the data flow representation to reflect the modification to the query script by visualizing a new data flow that is now to be executed based on the modification to the query script.

2. The computing system in accordance with claim 1, at least one of the tokens of at least some of the plurality of nodes of the syntax tree being correlated with a script location identifier identifying a location in the query script where the token appears.

3. The computing system in accordance with claim 1, the at least some of the plurality of nodes being subject to the evaluating in order of dependency of the plurality of nodes.

4. The computing system in accordance with claim 3, the each of at least some of the plurality of nodes comprising a dependent node and a dependee node, the dependee node providing output of an output data type as input to the dependent node,
   the evaluating being performed on the dependee node to identify the output data type of the output of the dependee node, and
   the evaluating next being performed on the dependent node using the output data type as the input data type of the input to the dependent node to thereby determine an output data type of at least one output of the dependent node.

5. The computing system in accordance with claim 1, the method further comprising:
   causing a visualization of the data flow representation to be output on a display, the visualization including a plurality of visualized nodes, each corresponding to one or more of the plurality of nodes of the data flow representation.

6. The computing system in accordance with claim 5, for at least some of the plurality of visualized nodes, the visualized node correlates to a portion of the query script using a script location identifier for at least one token of at least one node of the visualized node.

7. The computing system in accordance with claim 6, for at least one of the at least some of the visualized nodes, the visualized node has a control that, when interacted with by a user, causes the correlated portion of the query script to be visually emphasized.

8. The computing system in accordance with claim 1, the query language being a big query language.

9. A method for generating and dynamically updating a data flow representation from a syntax tree that is based on a query script, the data flow representation being dynamically updated in response to changes to the query script in order to facilitate efficient drafting and correction of the query script by visualizing, via the data flow representation, which specific data flows the query script will cause to happen, the method comprising the following:
   accessing a syntax tree comprising a plurality of nodes, each node in the plurality of nodes comprising one or more tokens parsed from query script drafted in a query language;
   evaluating each of at least some of the plurality of nodes to do the following for each evaluated node:
      identify a data type of one or more inputs to the node wherein, for a first node included in the plurality of nodes, identifying a first data type for a first input of the first node is deferred due to one or more upstream nodes not having been evaluated yet such that the first data type is determined after a deferral period;

apply a grammar set of the query language to the one or more tokens of the node to identify an output data type of one or more outputs from the node; and for a particular node in the plurality of nodes, build a dictionary that includes a map mapping a query statement included in the query script to a particular data flow representative of the particular node such that the particular node is obtainable from the dictionary by referencing the query statement;

formulating a data flow representation based on the syntax tree and augmented with the data types identified during said evaluating; and in response to a modification to the query script, dynamically modify the data flow representation to reflect the modification to the query script by visualizing a new data flow that is now to be executed based on the modification to the query script.

10. The method in accordance with claim 9, at least one of the tokens of at least some of the plurality of nodes of the syntax tree being correlated with a script location identifier identifying a location in the query script where the token appears.

11. The method in accordance with claim 9, the at least some of the plurality of nodes being subject to the evaluating in order of dependency of the plurality of nodes.

12. The method in accordance with claim 11, the each of at least some of the plurality of nodes comprising a dependent node and a dependee node, the dependee node providing output of an output data type as input to the dependent node, the evaluating being performed on the dependee node to identify the output data type of the output of the dependee node, and the evaluating next being performed on the dependent node using the output data type as the input data type of the input to the dependent node to thereby determine an output data type of at least one output of the dependent node.

13. The method in accordance with claim 9, the each of at least some of the plurality of nodes comprising a first dependent node, a second dependent node, and a dependee node, the dependee node providing output as input to the first dependent node and providing output as input to the second dependent node, the evaluating being performed on the dependee node to identify the output data type of the output provided as input to the first dependent node and the output data type of the output provided as input to the second dependent node;

after the evaluating being performed on the dependee node, performing the evaluating on the first dependent node using the output data type of the output provided to the first dependent node as the input data type of the input to the first dependent node to thereby determine an output data type of at least one output of the first dependent node; and after the evaluating being performed on the dependee node, performing the evaluating on the second dependent node using the output data type of the output provided to the second dependent node as the input data type of the input to the second dependent node to thereby determine an output data type of at least one output of the second dependent node.

14. The method in accordance with claim 9, the each of at least some of the plurality of nodes comprising a dependent node, a first dependee node, and a second dependee node, the first dependee node providing output as input to the dependent node, the second dependee node also provide output as input data to the dependent node, the evaluating being performed on the first dependee node to identify the output data type of the output provided by the first dependee node to the dependent node;

the evaluating being performed on the second dependee node to identify the output data type of the output provided by the second dependee node to the dependent node;

after the evaluating is performed on the first dependee node and on the second dependee node, performing the evaluating on the dependent node using the output data type of the output provided by the first dependee node as the input data type of the first input to the dependent node and using the output data type of the output provided by the second dependee node as the input data type of the input to the dependent node.

15. The method in accordance with claim 9, the method further comprising:

causing a visualization of the data flow representation to be output on a display, the visualization including a plurality of visualized nodes, each corresponding to one or more of the plurality of nodes of the data flow representation.

16. The method in accordance with claim 15, for at least some of the plurality of visualized nodes, the visualized node correlates to a portion of the query script using a script location identifier for at least one token of at least one node of the visualized node.

17. The method in accordance with claim 16, for at least one of the at least some of the visualized nodes, the visualized node has a control that, when interacted with by a user, causes the correlated portion of the query script to be visually emphasized.

18. The method in accordance with claim 9, the query language being a big query language.

19. A computer system configured to generate and dynamically update a data flow representation from a syntax tree that is based on a query script, the data flow representation being dynamically updated in response to changes to the query script in order to facilitate efficient drafting and correction of the query script by visualizing, via the data flow representation, which specific data flows the query script will cause to happen, said computing system comprising:

one or more processors; and one or more computer-readable hardware storage devices that store computer-executable instructions that are executable by the one or more processors to cause the computer system to at least:

access a syntax tree comprising a plurality of nodes, each node in the plurality of nodes comprising one or more tokens parsed from query script drafted in a query language;

evaluate each of at least some of the plurality of nodes to do the following for each evaluated node:

identify a data type of one or more inputs to the node wherein, for a first node included in the plurality of nodes, identifying a first data type for a first input of the first node is deferred due to one or more upstream nodes not having been evaluated yet such that the first data type is determined after a deferral period;

apply a grammar set of the query language to the one or more tokens of the node to identify an output data type of one or more outputs from the node; and for a particular node in the plurality of nodes, build a dictionary that includes a map mapping a query statement included in the query script to a particular data flow representative of the particular node such that the particular node is obtainable from the dictionary by referencing the query statement;

formulate a data flow representation based on the syntax tree and augmented with the data types identified during said evaluating;

in response to a modification to the query script, dynamically modify the data flow representation to reflect the modification to the query script by visualizing a new data flow that is now to be executed based on the modification to the query script; and display a user interface that has a particular visual layout, the particular visual layout being structured to cause at least a portion of the query script to be displayed simultaneously with at least a portion of the data flow representation.

20. The computer system in accordance with claim 19, wherein the user interface further displays a plurality of visualized nodes, each corresponding to one or more of the plurality of nodes of the data flow representation.

* * * * *